(12) United States Patent
Ueda (10) Patent No.: US 12,506,940 B2
(45) Date of Patent: Dec. 23, 2025

(54) IMAGE PICKUP APPARATUS WITH HIGH HEAT DISSIPATION PERFORMANCE

(71) Applicant: CANON KABUSHIKI KAISHA, Tokyo (JP)

(72) Inventor: Yuji Ueda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 101 days.

(21) Appl. No.: 18/533,641

(22) Filed: Dec. 8, 2023

(65) Prior Publication Data

US 2024/0205525 A1 Jun. 20, 2024

(30) Foreign Application Priority Data

Dec. 16, 2022 (JP) ................... 2022-201241

(51) Int. Cl.
*H04N 23/52* (2023.01)
*H04N 23/51* (2023.01)

(52) U.S. Cl.
CPC ............. *H04N 23/52* (2023.01); *H04N 23/51* (2023.01)

(58) Field of Classification Search
CPC ......... H04N 23/51; H04N 23/52; H04N 23/54
See application file for complete search history.

(56) References Cited

U.S. PATENT DOCUMENTS

| 11,262,747 | B2 * | 3/2022 | Hoofard | .................... B60R 1/22 |
| 2019/0049819 | A1 * | 2/2019 | Tokiwa | .................... H04N 23/51 |
| 2021/0055631 | A1 * | 2/2021 | Mano | ................. H05K 7/20418 |
| 2022/0094853 | A1 * | 3/2022 | Xu | ......................... H04N 23/54 |

FOREIGN PATENT DOCUMENTS

JP 2013-120955 A 6/2013

* cited by examiner

*Primary Examiner* — Amy R Hsu
(74) *Attorney, Agent, or Firm* — Cowan, Liebowitz & Latman, P.C.

(57) ABSTRACT

An image pickup apparatus having high heat dissipation performance. The image pickup apparatus comprises a board having an image pickup device, a sheet metal member disposed closer to a front surface side than the board and adjacent to the board in an optical axis direction, an electronic component board disposed closer to a back surface side than the board, and a battery chamber disposed near an outer edge of the board. The sheet metal member is thermally connected to the board, and includes an arm, which is formed integrally with and made of the same material with the sheet metal member. The arm extends in the optical axis direction toward the back surface side, to a position closer to the back surface side than the board, and is disposed at a position closer to the optical axis than the battery chamber.

18 Claims, 10 Drawing Sheets

IMAGE PICKUP APPARATUS WITH HIGH HEAT DISSIPATION PERFORMANCE

BACKGROUND OF THE INVENTION

Field of the Invention

The present invention relates to an image pickup apparatus having high heat dissipation performance.

Description of the Related Art

An image pickup apparatus such as a digital camera or a digital video camera includes therein an image pickup device that generates heat during driving, and a heat generating element such as a control IC or an image processing IC. There is a demand for such an image pickup apparatus to increase the number of pixels of the image pickup device and to increase the speed of image processing. Furthermore, opportunities to shoot still images and opportunities to shoot moving images, while acquiring live view videos, are increasing. As a result, power consumption increases, and an amount of heat generated in the image pickup apparatus increases.

In order to make the image pickup apparatus stable and usable for a long time, it is necessary to release heat generated inside the image pickup apparatus to the outside to suppress an increase in the internal temperature of the image pickup apparatus or the temperature of the heat generating element itself. Therefore, for example, Japanese Laid-Open Patent Publication (kokai) No. 2013-120955 proposes a configuration in which a chassis member of an image pickup apparatus and a heat generating element are connected to each other via a flexible heat transfer member, to efficiently diffuse heat of the heat generating element to an exterior.

However, in the technique disclosed in the above described Japanese Laid-Open Patent Publication (kokai) No. 2013-120955, a conduction destination of heat generated by the heat generating element is limited to the chassis member, and hence particularly in a small image pickup apparatus having a small exterior area, there is a possibility that heat cannot be sufficiently released from the exterior to the outside. Furthermore, in consideration of the fact that the image pickup apparatus is required to be downsized, it is also necessary to avoid upsizing the image pickup apparatus for heat dissipation.

SUMMARY OF THE INVENTION

The present invention provides an image pickup apparatus having high heat dissipation performance while avoiding an increase in size thereof.

Accordingly, the present invention provides an image pickup apparatus comprising an image pickup device board on which an image pickup device is mounted, a first sheet metal member disposed closer to a front surface side of the image pickup apparatus than the image pickup device board and disposed in adjacent to the image pickup device board in an optical axis direction, an electronic component board disposed closer to a back surface side of the image pickup apparatus than the image pickup device board, and a battery chamber that is disposed near an outer edge of the image pickup device board and houses a battery, wherein the first sheet metal member is thermally connected to the image pickup device board, the first sheet metal member includes a first arm portion extending in the optical axis direction toward the back surface side of the image pickup apparatus, wherein the first arm portion extends to a position closer to the back surface side of the image pickup apparatus than the image pickup device board in the optical axis direction, the first arm portion is formed integrally with the first sheet metal member and is made of a same material, and the first arm portion is disposed at a position closer to the optical axis than the battery chamber on a projection plane in the optical axis direction.

According to the present invention, it is possible to realize an image pickup apparatus having high heat dissipation performance while avoiding an increase in size thereof.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1A:
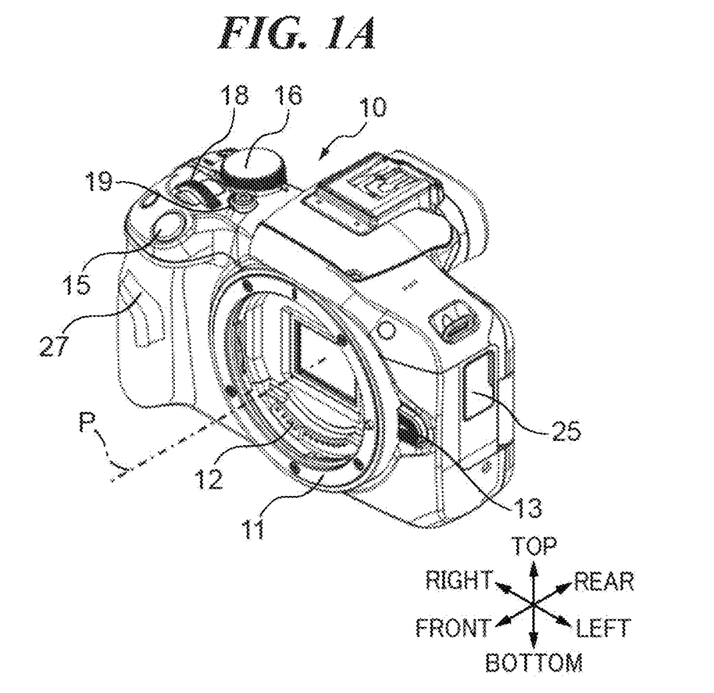
FIGS. 1A and 1B are perspective views showing an appearance of an image pickup apparatus according to an embodiment.
Figure 1B:
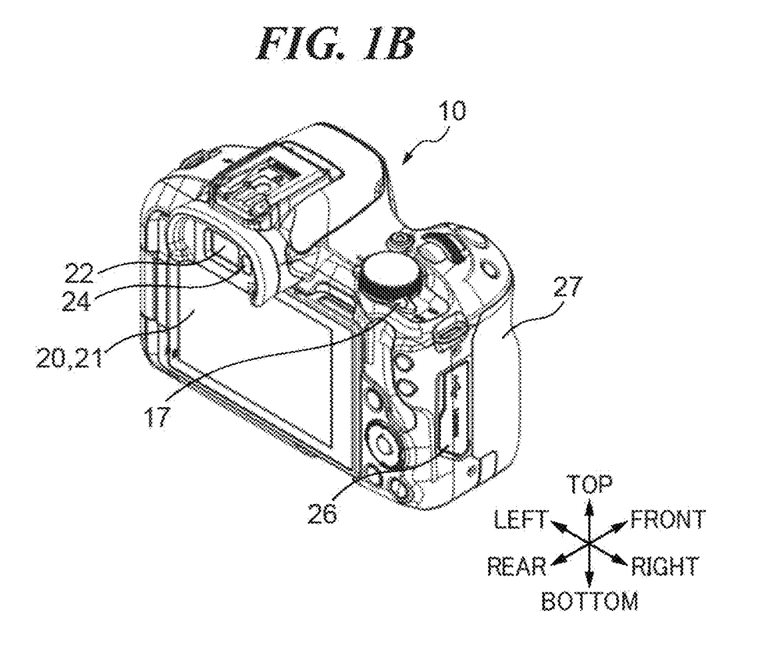

FIGS. 1A and 1B are perspective views showing an appearance of an image pickup apparatus 10 according to an embodiment. FIG. 1A is a view of the image pickup apparatus 10 as viewed from diagonally above forward, and FIG. 1B is a view of the image pickup apparatus 10 as viewed from diagonally above rearward. The image pickup apparatus 10 is a so-called mirrorless digital single-lens camera.

In the description of the present embodiment, the image pickup apparatus refers to a camera body of a mirrorless digital single-lens camera, and does not include a taking lens unit (interchangeable lens) (not shown) detachable from the camera body. Furthermore, front, rear, left, right, top, and bottom directions to define the image pickup apparatus 10 are defined as directions when viewed from a photographer (user) (not shown) holding the image pickup apparatus 10 at a lateral position as shown in FIGS. 1A and 1B.

A mount portion 11 for detachably fixing a taking lens unit (not shown) is provided on a front surface of the image pickup apparatus 10. An optical axis P indicated by an alternate long and short dash line in FIG. 1A passes through a center of the mount portion 11 and substantially coincides with an optical axis of an image pickup optical system of the taking lens unit in a state where the taking lens unit is attached to the mount portion 11. The mount portion 11 is provided with a mount contact 12 that enables communication of a control signal, a state signal, a data signal, and/or the like between the image pickup apparatus 10 and the taking lens unit and supplies power to the taking lens unit. Furthermore, a lens unlock button 13 is provided at a position close to the mount portion 11 on the front surface of the image pickup apparatus 10. The user of the image pickup apparatus 10 can detach the taking lens unit from the image pickup apparatus 10 by rotating the taking lens unit attached to the mount portion 11 in a predetermined direction in a state where the lens unlock button 13 is pressed.

A grip portion 27 is formed at a right end portion of the image pickup apparatus 10. The grip portion 27 has a shape that allows the user to easily hold the image pickup apparatus 10 with the right hand. A release button 15 and a main electronic dial 18 are disposed at a position on an upper surface of image pickup apparatus 10 where the user is allowed to operate the release button 15 and the main electronic dial 18 with the index finger of the right hand while holding the grip portion 27 with the right hand. The release button 15 is an operation member for instructing a control unit (not shown) of the image pickup apparatus to start shooting. The main electronic dial 18 is a rotary operation member. The user can change setting values such as a shutter speed and a diaphragm by turning the main electronic dial 18.

On the upper surface of the image pickup apparatus 10, near the main electronic dial 18, a mode changeover switch 16 for switching a shooting modes, and a moving image button 19 used for instructing start/stop of moving image shooting (recording) are disposed. A power switch 17, which is a rotary operation member for switching on/off of a power supply of the image pickup apparatus 10, is disposed near the mode changeover switch 16.

A display unit 20 that displays an image and various types of information, is provided on a back side of the image pickup apparatus 10. A touch panel 21 is arranged in a superimposed manner on a display surface of the display unit 20. The touch panel 21 is configured to detect a touch operation on the display surface of the display unit 20 and to issue instruction of various operations to a control unit (not shown). An eyepiece unit 22 is provided above the display unit 20. The user can visually recognize an image/video displayed on the EVF (not shown) disposed inside the image pickup apparatus 10 through the eyepiece unit 22. An eyepiece detection unit 24 that detects whether or not the user places his/her eyes close to the eyepiece unit 22, is disposed near the eyepiece unit 22.

A first terminal cover 25 is provided on a left side surface of the image pickup apparatus 10, and a second terminal cover 26 is provided on a right side surface of the image pickup apparatus 10. Each of the first terminal cover 25 and the second terminal cover 26 is a member that protects a connector for connecting a cord (not shown) for connecting the image pickup apparatus 10 and an external device (not shown).

Figure 2A:
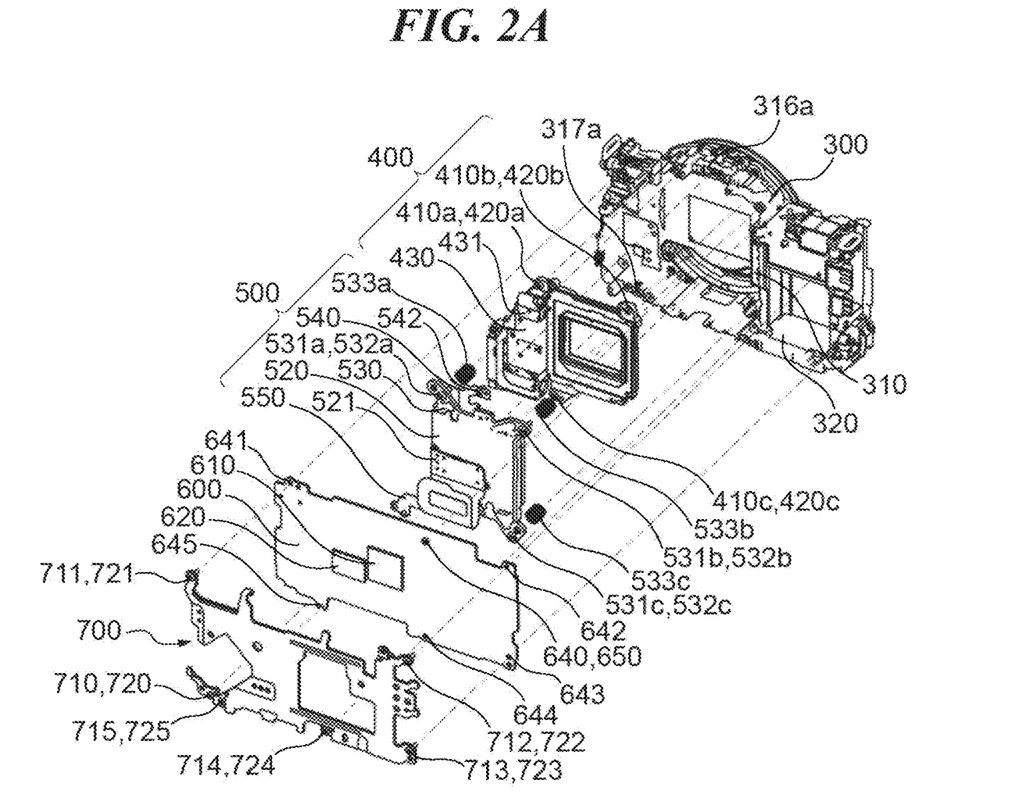
FIGS. 2A and 2B are exploded perspective views showing an internal configuration of the image pickup apparatus.
Figure 2B:
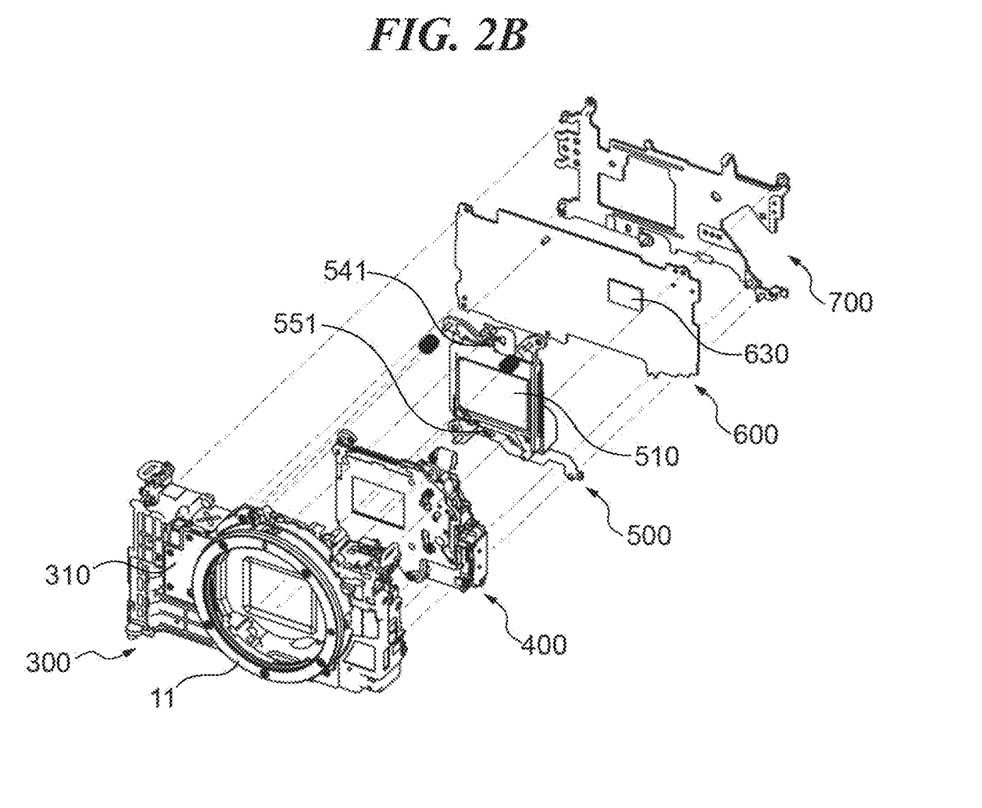

FIGS. 2A and 2B are exploded perspective views showing an internal configuration of the image pickup apparatus 10. FIG. 2A is a view of the image pickup apparatus 10 as viewed from diagonally above rearward, and FIG. 2B is a view of the image pickup apparatus 10 as viewed from diagonally above forward. FIGS. 2A and 2B show main components of the image pickup apparatus 10. The image pickup apparatus 10 includes a base member 300 having a first sheet metal member 310, a shutter unit 400, an image pickup device unit (image pickup device board) 500, a main board (electronic component board) 600, and a second sheet metal member 700.

The base member 300 is a resin member integrally formed with the first sheet metal member 310 by insert molding, and is a holding member that holds the mount portion 11, the shutter unit 400, the image pickup device unit 500, the main board 600, and the second sheet metal member 700. The shutter unit 400, the image pickup device unit 500, the main board 600, and the second sheet metal member 700 are assembled to the base member 300 in this order. The base member 300 includes a battery chamber 320 that houses a battery (not shown) that supplies power to the image pickup apparatus 10.

The shutter unit 400 includes a drive mechanism (not shown) that opens and closes a shutter curtain (not shown), and controls the exposure time of an image pickup device 510 by the opening and closing operation of the shutter curtain. The shutter unit 400 is provided with screw holes 410a, 410b, and 410c. The shutter unit 400 is fastened to the base member 300 by screws 420a, 420b, and 420c inserted through the screw holes 410a, 410b, and 410c. The shutter unit 400 includes a first flexible board 430. The first flexible board 430 is electrically and mechanically connected to the main board 600 via a terminal portion 431, so that various signals can be transmitted and received between the shutter unit 400 and the main board 600.

The image pickup device unit 500 includes the image pickup device 510, a sensor board 520, a sensor plate 530 (third sheet metal member), a first heat transfer plate 540, and a second heat transfer plate 550. The image pickup device 510 is a photoelectric conversion element that converts incident light from the taking lens unit into an electric signal, and is, for example, a CMOS sensor, a CCD sensor, or the like. The image pickup device 510 is mounted on a front surface (surface) of the sensor board 520, and various circuit components are mounted on a back surface (rear surface) of the sensor board 520. A second flexible board 521 connects a connector (not shown) mounted on the back surface of the sensor board 520 and a connector (not shown) mounted on the main board 600. As a result, the sensor board 520 and the main board 600 are also electrically connected each other, and transmission and reception of an electric signal can be performed between the image pickup device 510 and a CPU 610 or the like mounted on the main board 600.

The sensor plate 530 is a sheet metal member made of metal (aluminum, copper, or the like) having high thermal conductivity. The image pickup device 510 mounted on the sensor board 520 is fixed to the sensor plate 530 with an adhesive (for example, an ultraviolet-curable adhesive). Screw holes 531a, 531b, and 531c are provided in the sensor plate 530. The sensor plate 530 is fastened to the base member 300 by adjustment screws 532a, 532b, and 532c inserted through the screw holes 531a, 531b, and 531c.

Compression coil springs 533a, 533b, and 533c are disposed between the sensor plate 530 and the base member 300. One end of each of the compression coil springs 533a, 533b, and 533c is in contact with the base member 300, and the other end of each of the compression coil springs 533a, 533b, and 533c is in contact with the sensor plate 530. The compression coil springs 533a, 533b, and 533c are assembled in a state of being contracted by a predetermined amount from a natural state (unloaded state), and bias the sensor plate 530 in a direction (rearward direction) opposite to a direction (forward direction) in which the mount portion 11 is disposed. By adjusting a tightening amount of the adjustment screws 532a, 532b and 532c, a distance (flange back) from a mount surface of the mount portion 11 to the image pickup device 510 can be adjusted to a desired distance.

The first heat transfer plate 540 and the second heat transfer plate 550 are sheet metal members made of metal (for example, aluminum, copper, or the like) having high thermal conductivity. One end of the first heat transfer plate 540 is fastened to the sensor plate 530 with a screw 541. The other end of the first heat transfer plate 540 is fastened to a first exposed portion 316a of the first sheet metal member 310 with a screw 542. Thus, the first heat transfer plate 540 thermally connects the sensor plate 530 and the base member 300. One end of the second heat transfer plate 550 is fastened to the sensor plate 530 with a screw 551. The other end of the second heat transfer plate 550 is fastened (fastened together) to the first sheet metal member 310 together with the second sheet metal member 700 by a screw 720 in a state where the other end of the second heat transfer plate 550 is sandwiched between and is in contact with the second sheet metal member 700 and a second exposed portion 317a of the first sheet metal member 310. Thus, the second heat transfer plate 550 thermally connects the second sheet metal member 700 and the base member 300 to the sensor plate 530.

With such a configuration, in the image pickup apparatus 10, heat generated in the image pickup device 510 and the sensor board 520 can be transferred to the base member 300 and the second sheet metal member 700 via the sensor plate 530, the first heat transfer plate 540, and the second heat transfer plate 550.

The main board 600 is a circuit board on which various components (electrical components and electronic components) are mounted. The CPU 610 which is a main heat generating element is mounted on the main board 600. It should be noted that the CPU 610 performs overall control of the image pickup apparatus 10, and also, in the present embodiment, performs image processing on an image signal (video signal) output from the image pickup device 510. In addition to the CPU 610, circuit components that generate heat, such as DRAMs 620 and 630, are mounted on the main board 600. Furthermore, a plurality of connectors (not shown) to which the first flexible board 430, the second flexible board 521, and the like are connected, are mounted on the main board 600.

The main board 600 has a screw hole 640. The main board 600 is disposed on a back side of the image pickup device unit 500, and is fastened to the base member 300 by a screw 650 inserted into the screw hole 640. The main board 600 is also fastened to the base member 300 by screws 721, 722, 723, 724, and 725 inserted into screw holes 641, 642, 643, 644, and 645, while being sandwiched between the base member 300 and the second sheet metal member 700. At this time, as will be described later, the main board 600 and the second sheet metal member 700 are fastened together and fixed to the base member 300 by the screws 721, 722, 723, 724, and 725. With such a configuration, heat generated by the CPU 610, the DRAMs 620 and 630, and the like can be transferred to the base member 300 and the second sheet metal member 700 via the main board 600.

The second sheet metal member 700 is a sheet metal member made of metal (for example, aluminum, copper, or the like) having high thermal conductivity. The second sheet metal member 700 is disposed on a back surface side of the main board 600, is disposed adjacent to the main board 600 in an optical axis direction, and has screw holes 710, 711, 712, 713, 714, and 715. The second sheet metal member 700 and the second heat transfer plate 550 are fastened together and fixed at a fastening location at which the screw 720 is inserted into the screw hole 710, which constructs a heat transfer path of heat generated in the image pickup device 510 and the sensor board 520. The main board 600 and the second sheet metal member 700 are mechanically and integrally connected each other. Specifically, the second sheet metal member 700 is fastened to the base member 300 by the screws 721, 722, 723, 724, and 725 inserted into the screw holes 710, 711, 712, 713, 714, and 715 in a state where the main board 600 is sandwiched between the second sheet metal member 700 and the base member 300. Locations fastened by the screws 721, 722, 723, 724, and 725 inserted into the screw holes 711, 712, 713, 714, and 715 serve as heat transfer paths of heat generated in the main board 600 to the base member 300 and the second sheet metal member 700. That is, the main board 600 and the second sheet metal member 700 are thermally connected.

Figure 3A:
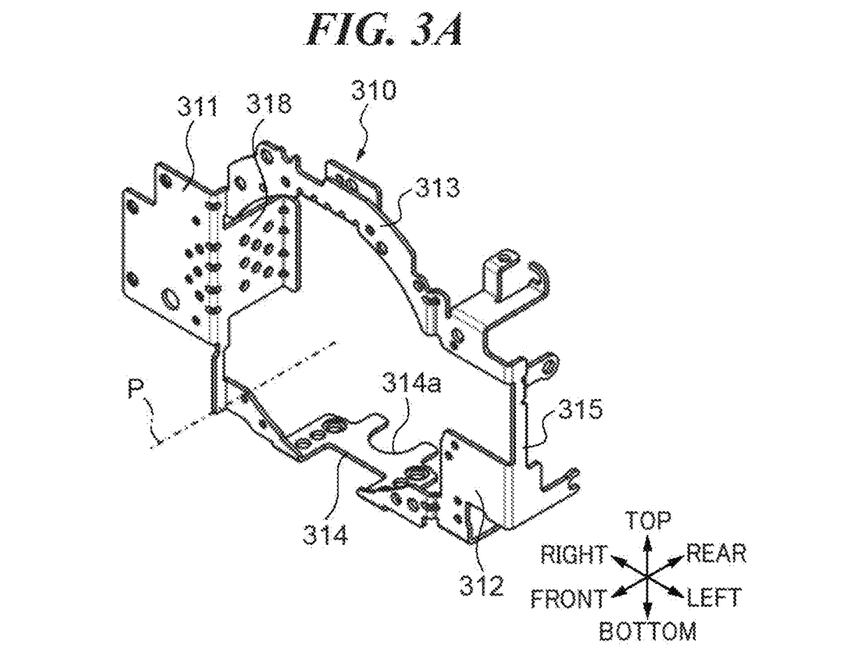
FIGS. 3A and 3B are perspective views of a sheet metal member constituting a base member.
Figure 3B:
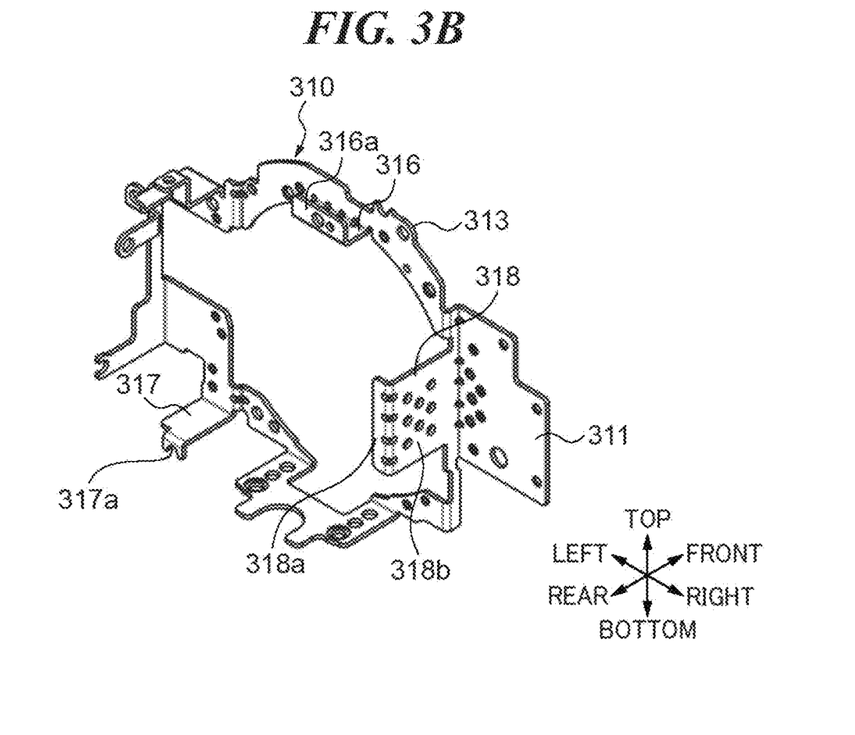

Next, the first sheet metal member 310 insert-molded in the base member 300 will be described. FIG. 3A is a perspective view of the first sheet metal member 310 as viewed from diagonally above forward, and FIG. 3B is a perspective view of the first sheet metal member 310 as viewed from diagonally above rearward. The first sheet metal member 310 is disposed on a front side of the image pickup device 510 and the CPU 610, and is formed of metal (for example, aluminum, copper, or the like) having high thermal conductivity. Such a first sheet metal member 310 plays a role of improving heat dissipation performance in addition to a role of improving strength of the base member 300.

The first sheet metal member 310 has a first planar portion 311 and a second planar portion 312 which are substantially orthogonal to the optical axis P. The first planar portion 311 and the second planar portion 312 are provided on opposite sides to each other across the optical axis P. Specifically, the first planar portion 311 is provided on the right side and the second planar portion 312 is provided on the left side across the optical axis P. The first planar portion 311 and the second planar portion 312 are connected each other by a first connection portion 313, a second connection portion 314, and a third connection portion 315.

The first connection portion 313 and the second connection portion 314 are disposed outside an opening region of the mount portion 11 so as not to block incident light from the taking lens unit. That is, the first sheet metal member 310 has an opening formed by the first planar portion 311, the second planar portion 312, the first connection portion 313, the second connection portion 314, and the third connection portion 315.

The second connection portion 314 has a recess 314a disposed so as to be in contact with a tripod mount (not shown). The third connection portion 315 is provided so as to be substantially orthogonal to the second planar portion 312, and connects the second planar portion 312 and the first connection portion 313 disposed so as to avoid the lens unlock button 13 (not shown in FIG. 3). In this way, the first planar portion 311 and the second planar portion 312 of the first sheet metal member 310 are thermally connected at upper and lower portions thereof via the first connection portion 313, the second connection portion 314, and the third connection portion 315, which makes it possible to attain an effect of dispersing heat in the entire first sheet metal member 310.

The first sheet metal member 310 has a first standing bending portion 316 extending in a direction of the optical axis P (hereinafter, also referred to as "optical axis direction") from the first connection portion 313 toward a back surface side (rear side). The first standing bending portion 316 has the planar first exposed portion 316a that is substantially orthogonal to the optical axis P and exposed to the external appearance of the base member 300. As described above, the first exposed portion 316a is fastened to the first heat transfer plate 540 by the screw 542 in a state of being in contact with the first heat transfer plate 540. Similarly, the first sheet metal member 310 has a second standing bending portion 317 (second arm portion) extending in the optical axis direction from the second planar portion 312 toward the back surface side. The second standing bending portion 317 has the planar second exposed portion 317a that is substantially orthogonal to the optical axis P and exposed to the external appearance of the base member 300.

As described above, in a state where the second exposed portion 317a and the second heat transfer plate 550 are in contact with each other, the second heat transfer plate 550 and the second sheet metal member 700 are fastened together and fixed by the screw 720. That is, the image pickup device unit 500, the second standing bending portion 317, and the second sheet metal member 700 are thermally connected. With such a configuration, heat generated in the image pickup device 510 can be transferred to the first sheet metal member 310 via the first heat transfer plate 540 and the second heat transfer plate 550.

The first sheet metal member 310 has an arm portion 318 extending from the first planar portion 311 toward the main board 600 (extending from the first planar portion 311 toward the back surface side in the optical axis direction). The first sheet metal member 310 and the arm portion 318 are formed integrally with each other and are made of a same material. The arm portion 318 plays the role of functioning as a heat transfer path of heat generated in the heating element such as the CPU 610 and the DRAMs 620 and 630 to the first sheet metal member 310 (that is, to the front side of the image pickup apparatus 10). Therefore, it is desirable to make a cross-sectional area of the arm portion 318 as large as possible by making a length of the arm portion 318 in an extending direction (front-rear direction) and a direction (vertical direction in the present embodiment) orthogonal to a thickness direction as long as possible.

Figure 4:
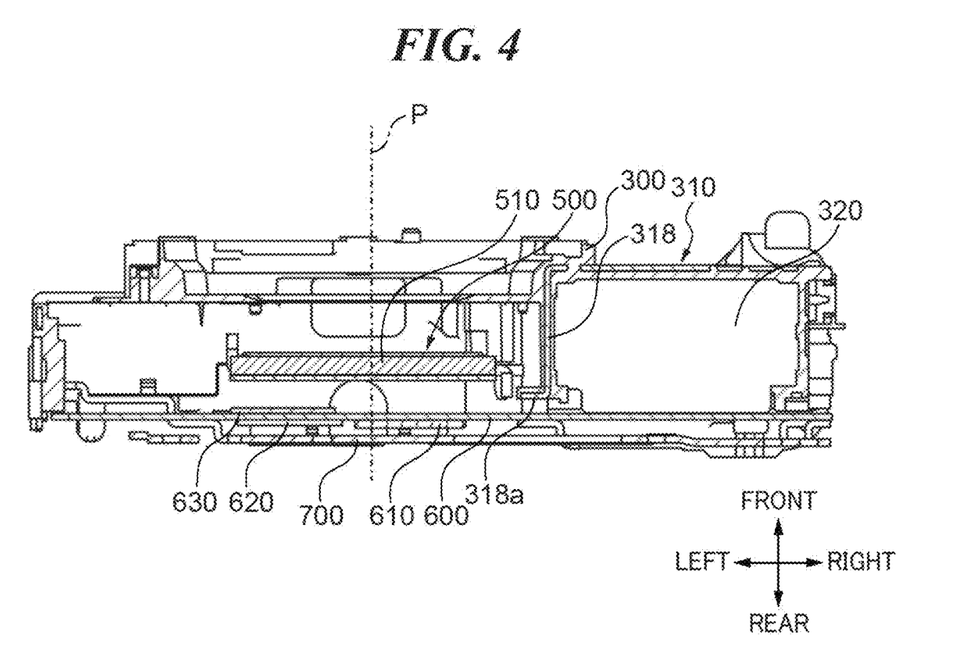
FIG. 4 is a cross-sectional view of the image pickup apparatus, showing a cross section including an optical axis and orthogonal to a vertical direction.

FIG. 4 is a cross-sectional view of the image pickup apparatus 10, and shows a cross section including the optical axis P and orthogonal to the vertical direction. In the cross section of the image pickup apparatus 10 shown in FIG. 4, the battery chamber 320 is disposed outside of (near an outer edge of) the image pickup device unit 500. Further, the arm portion 318 is disposed at a position closer to the optical axis P than the battery chamber 320. In other words, the arm portion 318 is disposed at a position closer to the optical axis P than the battery chamber 320 on a projection plane in (a plane projected from) the optical axis direction. As a result, heat transfer from the arm portion 318 to the grip portion 27 disposed near the battery chamber 320 can be suppressed. Specifically, the temperature rise of the grip portion 27 gripped by the user can be suppressed, which prevents the user from feeling uncomfortable due to the temperature rise of the grip portion 27. Furthermore, as compared with a case where the arm portion 318 is disposed on the right side (exterior side) of the battery chamber 320, in the present embodiment, a length of the heat transfer path from the inside of the image pickup apparatus 10 to the exterior surface is shortened, so that more efficient heat dissipation can be performed.

Figure 5A:
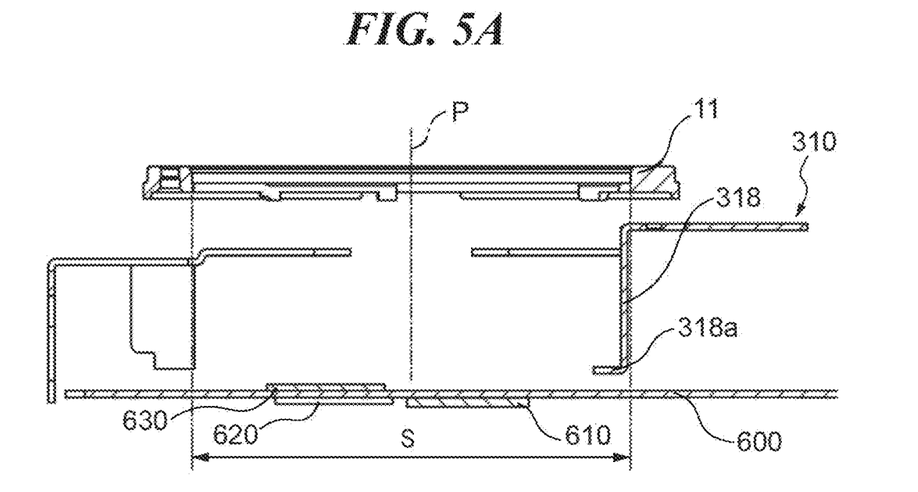
FIGS. 5A and 5B are a cross-sectional view showing a part of components extracted from the cross-sectional view of FIG. 4, and a front view of a sheet metal member constituting a base member, respectively.
Figure 5B:
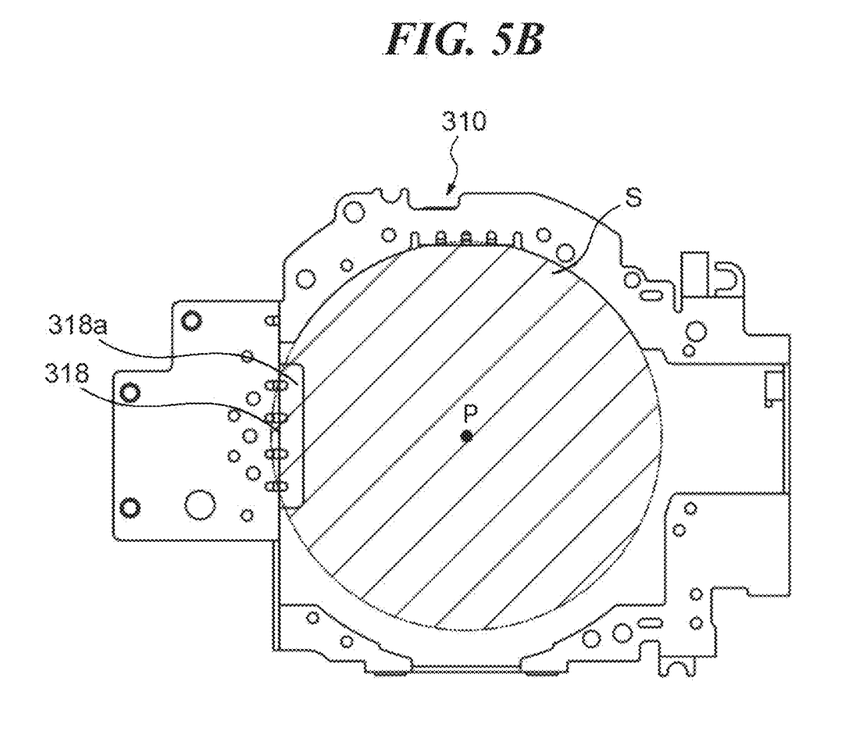

FIG. 5A is a cross-sectional view showing a part of components extracted from the cross-sectional view of FIG. 4. FIG. 5B is a front view of the first sheet metal member 310 constituting the base member 300. As shown in FIG. 5B, on the projection plane in the optical axis direction, the arm portion 318 is provided in the vicinity of an outer periphery of an opening region S such that most of the arm portion 318 overlaps the opening region S of the mount portion 11.

The heat generating element included in the image pickup apparatus 10 is often disposed at a position close to the optical axis P of the taking lens unit. For example, the image pickup device 510, which is one of the heat generating elements, is disposed such that the optical axis P passes through the center of the image pickup device 510 because the optical axis P of the taking lens unit and the center of the image pickup device 510 need to coincide with each other. Furthermore, the CPU 610, which is another heat generating element, is often disposed at a position close to the center of the image pickup apparatus 10 (that is, it is close to the optical axis P) in order to transfer heat generated by the CPU 610 to the entire exterior in a balanced manner as much as possible. As a result, an amount of heat generated around the optical axis P tends to increase inside the image pickup apparatus 10. Therefore, in the present embodiment, the arm portion 318 is disposed inside the opening region S of the mount portion 11 and as close to the optical axis P as possible within a range not blocking an incident light beam from the taking lens unit to the image pickup device 510. As a result, heat generated by a plurality of the heat generating elements inside the image pickup apparatus 10 can be efficiently conducted to the exterior of the image pickup apparatus 10.

Figure 6A:
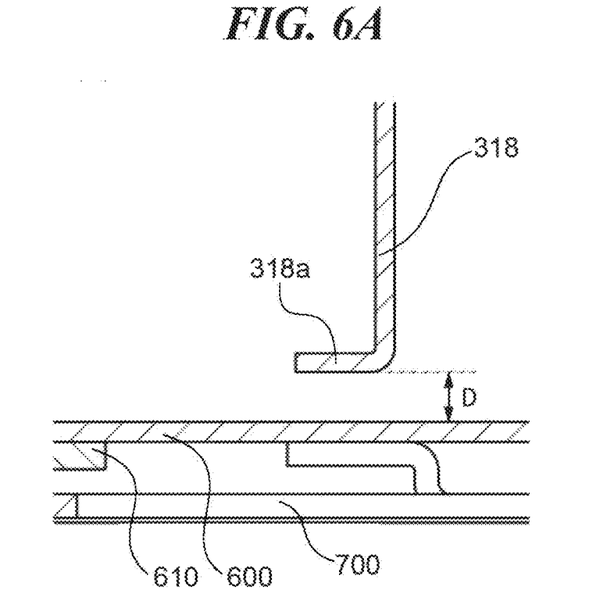
FIGS. 6A and 6B are a partially enlarged view of FIG. 5A and a diagram showing an arrangement example of a heat transfer member, respectively.

The arm portion 318 includes a planar portion 318b substantially parallel to the optical axis P and a bent portion 318a formed by the planar portion 318b being bent so as to be substantially orthogonal to the optical axis P. FIG. 6A is a partially enlarged view (partial cross-sectional view) in which a part around the bent portion 318a shown in FIG. 5A is enlarged.

The bent portion 318a is a portion close to the main board 600 in the optical axis direction, and a gap having a certain distance D is provided between the bent portion 318a and the main board 600. In a case where the bent portion 318a is brought into contact with the main board 600, the main board 600 may be damaged if an impact is applied to the image pickup apparatus 10 due to a user mistakenly dropping the image pickup apparatus 10 or the like. On the other hand, in a case where the main board 600 and the bent portion 318a are fixed by screw fastening or the like in order to prevent damage of the main board 600 due to an impact applied to the image pickup apparatus 10, various components cannot be mounted on the bent portion 318a and the vicinity thereof on the front and back of the main board 600. As a result, it is necessary to increase the size of the main board 600, and there is a concern that the image pickup apparatus 10 will increase in size. Therefore, the bent portion 318a is desirably disposed such that a gap having the certain distance D is formed between the bent portion 318a and the main board 600 in the optical axis direction.

No component (electric component, electronic component, etc.) is mounted on a surface of the main board 600, particularly in a range overlapping with a projection region of the bent portion 318a in the optical axis direction on the front surface (surface facing the bent portion 318a) of the main board 600. This aims to prevent the bent portion 318a from contacting a component and damaging the component when an impact is applied to the image pickup apparatus 10.

It should be noted that it is desirable that the bent portion 318a is not provided at a position overlapping with the CPU 610 on the projection plane of the main board 600 in the optical axis direction. This is because even in a case where the CPU 610 is mounted on a rear surface (back surface) of the main board 600, when an impact is applied to the image pickup apparatus 10, the bent portion 318a comes into contact with the main board 600, so that a crack may occur in a soldered portion of the CPU 610, leading to occurrence of conduction failure.

Figure 6B:
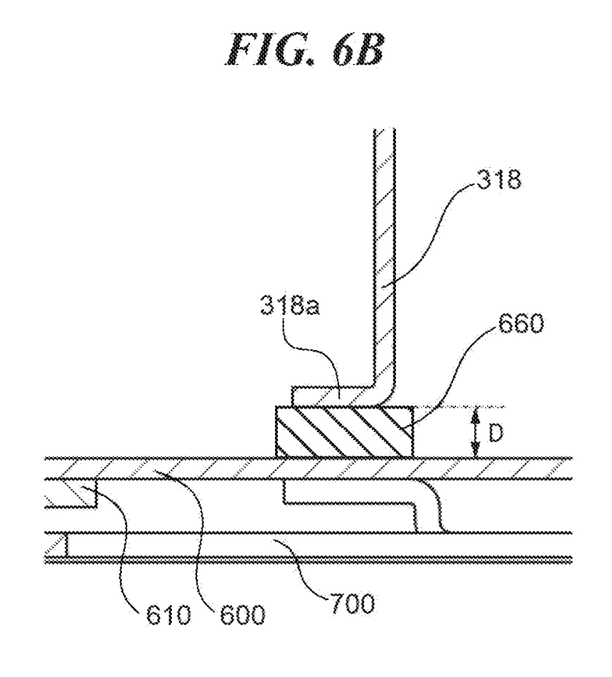

FIG. 6B is a diagram showing a configuration in which a heat transfer member 660 is disposed between the bent portion 318a and the main board 600. The heat transfer member 660 is disposed so as to fill the distance D, that is, the heat transfer member 660 is disposed so as to be in contact with the bent portion 318a and the main board 600. The heat transfer member 660 is made of a thermally conductive material, and thermally connects the arm portion 318 (the bent portion 318a) and the main board 600. Even if there is a space with the distance D between the bent portion 318a and the main board 600, heat is transferred from the main board 600 to the bent portion 318a (arm portion 318). Moreover, by disposing the heat transfer member 660 in the space of the distance D, the heat transfer performance from the main board 600 to the bent portion 318a (arm portion 318) can be improved.

It should be noted that the heat transfer member 660 is desirably an elastic member having elasticity. The heat transfer member 660 having elasticity can absorb an impact force when an impact is applied to the image pickup apparatus 10. As a result, even if an impact is applied to the image pickup apparatus 10, it is possible to prevent a large force from being applied from the bent portion 318a to the main board 600 via the heat transfer member 660. For example, for the heat transfer member 660, thermally conductive silicone rubber or the like obtained by blending a thermally conductive material into silicone rubber is used.

On the other hand, in a case where the heat transfer performance from the main board 600 to the arm portion 318 is excessively enhanced, a surface temperature of the exterior close to the image pickup device 510 excessively increases, and there is a possibility that the moving image shootable time (continuous driving time) of the image pickup device 510 becomes short. Therefore, it is desirable to adjust the heat transfer performance to the first sheet metal member 310 by determining whether or not to use the heat transfer member 660 and adjusting the distance D in consideration of the balance between a temperature rise of the heat generating element such as the image pickup device 510 and the CPU 610 and a temperature rise of the exterior surface. As a result, it is possible to extend the moving image shootable time of the image pickup device 510 to the maximum.

Figure 7:
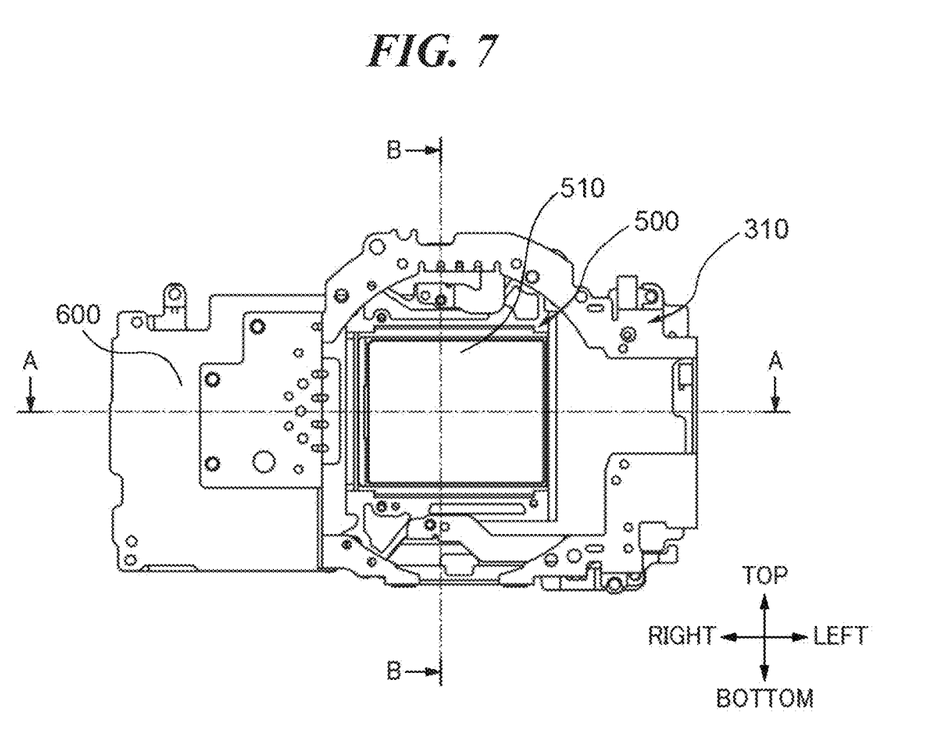
FIG. 7 is a front view of a main member group constituting a heat transfer path of the image pickup apparatus.
Figure 8A:
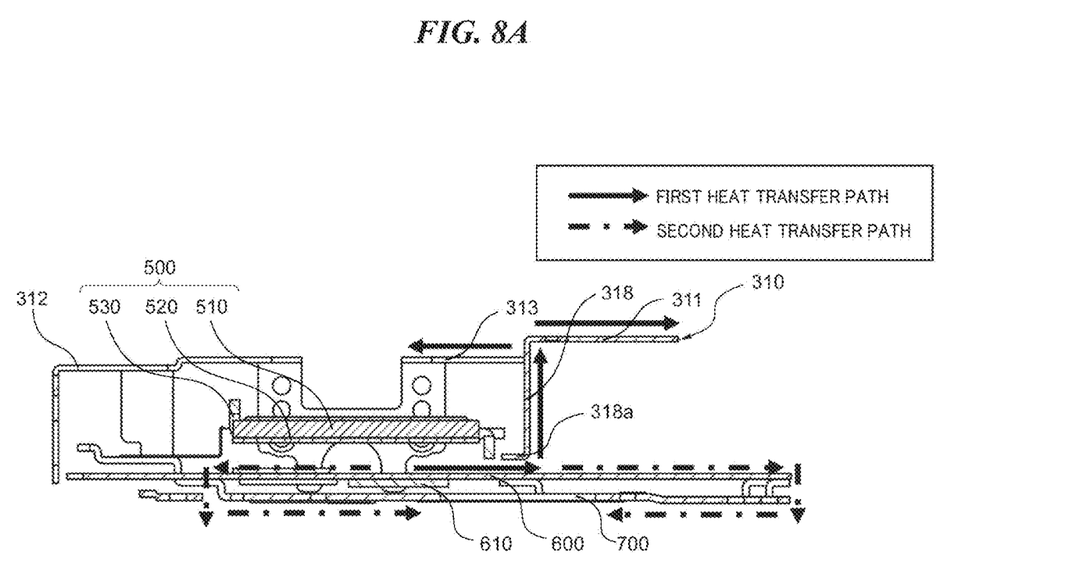
FIGS. 8A and 8B are a cross-sectional view at arrow A-A shown in FIG. 7 and a cross-sectional view at arrow B-B shown in FIG. 7, respectively.
Figure 8B:
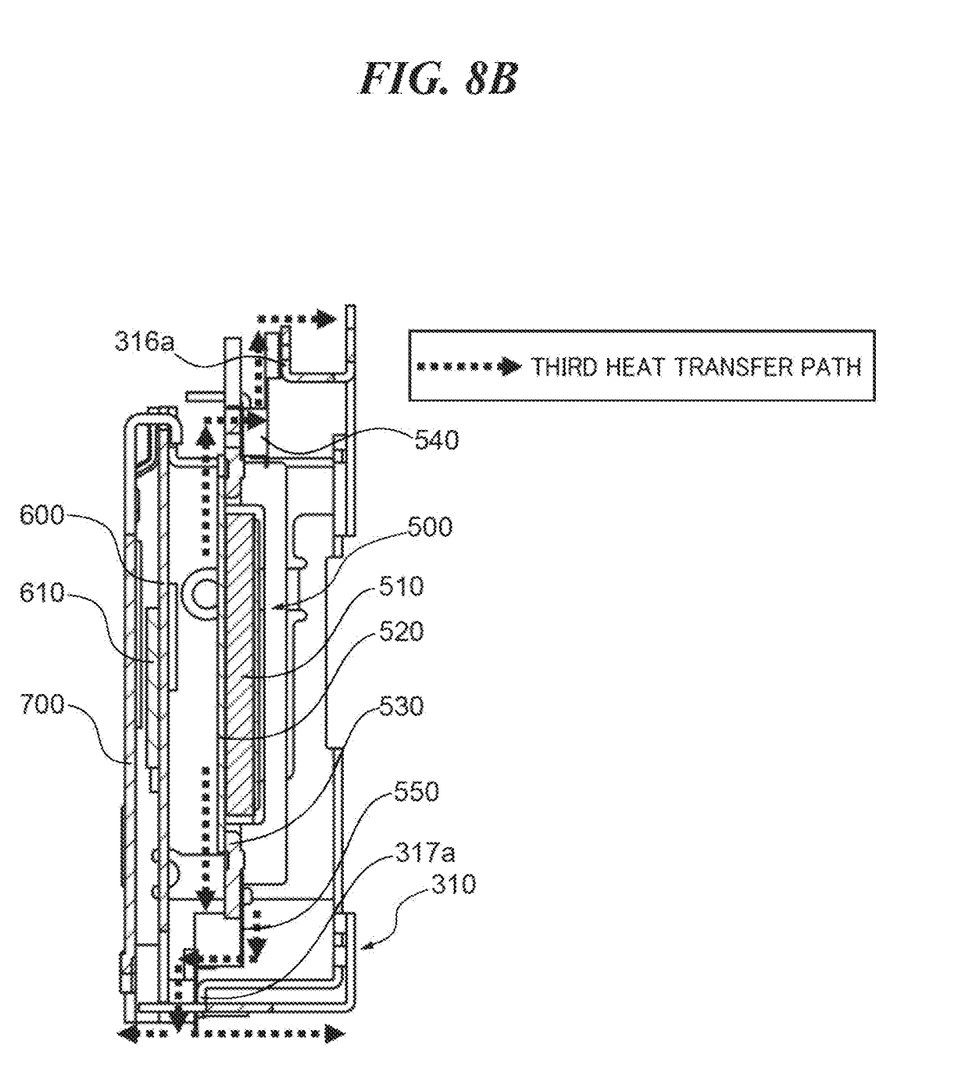

Next, a main heat transfer path formed inside the image pickup apparatus will be described. FIG. 7 is a front view of a main member group constituting a heat transfer path of the image pickup apparatus 10. FIG. 8A is a cross-sectional view at arrow A-A shown in FIG. 7, and FIG. 8B is a cross-sectional view at arrow line B-B shown in FIG. 7. The image pickup device unit 500 is mechanically and integrally connected to the first sheet metal member 310 at a plurality of locations sandwiching the opening of the first sheet metal member 310. As a result, the image pickup device unit 500 and the first sheet metal member 310 are thermally connected each other.

As shown in FIG. 8A, a first heat transfer path (solid arrows) of heat generated by the CPU 610 is a heat transfer path through which the heat is conducted, by being conducted through the main board 600 to the arm portion 318, to the first sheet metal member 310. That is, the first heat transfer path is a path that conducts heat generated by a heat generating element such as the CPU 610 mounted on the main board 600 to the front surface side of the image pickup apparatus 10. A second heat transfer path (arrows of alternate long and short dash lines) of the heat generated by the CPU 610 is a path through which the heat is conducted, through the main board 600 and a plurality of fastening portions by the screws 721, 722, 723, 724, and 725, to the entire second sheet metal member 700. That is, the second heat transfer path is a path that conducts heat generated by a heat generating element such as the CPU 610 mounted on the main board 600 to the back surface side of the image pickup apparatus 10.

A heat transfer path (hereinafter referred to as a "third heat transfer path") (dotted arrows) of heat generated by the image pickup device 510 has two paths. As shown in FIG. 8B, one of the third heat transfer paths is a path through which the heat is conducted, through the first heat transfer plate 540 and the first exposed portion 316a of the first sheet metal member 310, to the first sheet metal member 310. The other of the third heat transfer paths is a path through which the heat passes through the second heat transfer plate 550 and is transferred, via the fastening portion between the second exposed portion 317a (second standing bending portion 317) of the first sheet metal member 310 and the second sheet metal member 700, which are mechanically connected to each other by the screw 720, to the first sheet metal member 310 and the second sheet metal member 700.

In the image pickup apparatus 10, the front surface side of the image pickup apparatus 10 and the back surface side of the image pickup apparatus 10 are thermally connected by the first heat transfer path to the third heat transfer path, and thus heat generated by the heat generating element inside the image pickup apparatus 10 can be efficiently dispersed and transferred to the entire exterior of the image pickup apparatus 10. Furthermore, the first heat transfer path is formed at a position close to the optical axis P, and thus a heat transfer distance from the inside of the image pickup apparatus 10 to the entire exterior can be significantly shortened, which significantly improves heat dissipation performance.

It should be noted that a heat transfer path in the image pickup apparatus 10 is not limited to the first heat transfer path to the third heat transfer path. For example, as described above, the heat generated in the image pickup device 510 is conducted, via the sensor plate 530, the first heat transfer plate 540, and the second heat transfer plate 550, to the base member 300 and the second sheet metal member 700 and is dissipated. In this way, the heat generated inside the image pickup apparatus 10 is conducted to the exterior member through a member serving as the heat transfer path and a member in contact with the member. These auxiliary heat transfer paths also contribute to improvement of heat dissipation performance in the image pickup apparatus 10.

As described above, according to the present invention, it is possible to greatly improve the heat dissipation performance without increasing the size of the image pickup apparatus, and as a result, it is possible to shoot a moving image for a long time.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium.

The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-201241, filed Dec. 16, 2022, which is hereby incorporated by reference wherein in its entirety.

What is claimed is:

1. An image pickup apparatus comprising:
   an image pickup device board on which an image pickup device is mounted;
   a first sheet metal member disposed closer to a front surface side of the image pickup apparatus than the image pickup device board and disposed in adjacent to the image pickup device board in an optical axis direction;
   an electronic component board disposed closer to a back surface side of the image pickup apparatus than the image pickup device board;
   a battery chamber that is disposed near an outer edge of the image pickup device board and houses a battery and
   a second sheet metal member disposed closer to the back surface side of the image pickup apparatus than the electronic component board and disposed adjacent to the electronic component board in the optical axis direction,
   wherein the first sheet metal member is thermally connected to the image pickup device board,
   the first sheet metal member includes a first arm portion extending in the optical axis direction toward the back surface side of the image pickup apparatus, wherein the first arm portion extends to a position closer to the back surface side of the image pickup apparatus than the image pickup device board in the optical axis direction,
   the first arm portion is formed integrally with the first sheet metal member and is made of a same material, the first arm portion is disposed at a position closer to the optical axis than the battery chamber on a projection plane in the optical axis direction, and
   the electronic component board is mechanically and integrally connected to the second sheet metal member, and the electronic component board and the second sheet metal member are thermally connected.

2. The image pickup apparatus according to claim 1, wherein the electronic component board and the first arm portion are thermally connected via an elastic member made of a thermally conductive material.

3. The image pickup apparatus according to claim 1, wherein the first sheet metal member includes a second arm portion extending in the optical axis direction toward the back surface side of the image pickup apparatus, and
   the image pickup device board, the second arm portion, and the second sheet metal member are thermally connected.

4. The image pickup apparatus according to claim 3, wherein the second arm portion and the second sheet metal member are mechanically connected to each other.

5. The image pickup apparatus according to claim 1, wherein an electronic component is not mounted on a range of a surface of the electronic component board facing the first arm portion, the range overlapping a projection region of the first arm portion in the optical axis direction.

6. The image pickup apparatus according to claim 1, wherein
   the first sheet metal member includes an opening through which the optical axis passes,
   the image pickup device board is mechanically and integrally connected to the first sheet metal member at a plurality of locations sandwiching the opening, and
   the image pickup device board and the first sheet metal member are thermally connected.

7. An image pickup apparatus comprising:
   an image pickup device board on which an image pickup device is mounted;
   a first sheet metal member disposed closer to a front surface side of the image pickup apparatus than the image pickup device board and disposed in adjacent to the image pickup device board in an optical axis direction;
   an electronic component board disposed closer to a back surface side of the image pickup apparatus than the image pickup device board;
   a battery chamber that is disposed near an outer edge of the image pickup device board and houses a battery; and
   a second sheet metal member disposed closer to the back surface side of the image pickup apparatus than the electronic component board and disposed adjacent to the electronic component board in the optical axis direction,
   wherein the first sheet metal member is thermally connected to the image pickup device board,
   the first sheet metal member includes a first arm portion extending in the optical axis direction toward the back surface side of the image pickup apparatus, wherein the first arm portion extends to a position closer to the back surface side of the image pickup apparatus than the image pickup device board in the optical axis direction,
   the first arm portion is formed integrally with the first sheet metal member and is made of a same material, the first arm portion is disposed at a position closer to the optical axis than the battery chamber on a projection plane in the optical axis direction, the first sheet metal member includes a second arm portion extending in the optical axis direction toward the back surface side of the image pickup apparatus, and the image pickup device board, the second arm portion, and the second sheet metal member are thermally connected.

8. The image pickup apparatus according to claim 7, wherein the electronic component board and the first arm portion are thermally connected via an elastic member made of a thermally conductive material.

9. The image pickup apparatus according to claim 7, wherein the electronic component board is mechanically and integrally connected to the second sheet metal member, and the electronic component board and the second sheet metal member are thermally connected.

10. The image pickup apparatus according to claim 7, wherein the second arm portion and the second sheet metal member are mechanically connected to each other.

11. The image pickup apparatus according to claim 7, wherein an electronic component is not mounted on a range of a surface of the electronic component board facing the first arm portion, the range overlapping a projection region of the first arm portion in the optical axis direction.

12. The image pickup apparatus according to claim 7, wherein the first sheet metal member includes an opening through which the optical axis passes, the image pickup device board is mechanically and integrally connected to the first sheet metal member at a plurality of locations sandwiching the opening, and the image pickup device board and the first sheet metal member are thermally connected.

13. An image pickup apparatus comprising:

an image pickup device board on which an image pickup device is mounted;

a first sheet metal member disposed closer to a front surface side of the image pickup apparatus than the image pickup device board and disposed in adjacent to the image pickup device board in an optical axis direction;

an electronic component board disposed closer to a back surface side of the image pickup apparatus than the image pickup device board; and a battery chamber that is disposed near an outer edge of the image pickup device board and houses a battery, wherein the first sheet metal member is thermally connected to the image pickup device board, the first sheet metal member includes a first arm portion extending in the optical axis direction toward the back surface side of the image pickup apparatus, wherein the first arm portion extends to a position closer to the back surface side of the image pickup apparatus than the image pickup device board in the optical axis direction, the first arm portion is formed integrally with the first sheet metal member and is made of a same material, the first arm portion is disposed at a position closer to the optical axis than the battery chamber on a projection plane in the optical axis direction, the first sheet metal member includes an opening through which the optical axis passes, the image pickup device board is mechanically and integrally connected to the first sheet metal member at a plurality of locations sandwiching the opening, and the image pickup device board and the first sheet metal member are thermally connected.

14. The image pickup apparatus according to claim 13, wherein the electronic component board and the first arm portion are thermally connected via an elastic member made of a thermally conductive material.

15. The image pickup apparatus according to claim 13, further comprising a second sheet metal member disposed closer to the back surface side of the image pickup apparatus than the electronic component board and disposed adjacent to the electronic component board in the optical axis direction, wherein the electronic component board is mechanically and integrally connected to the second sheet metal member, and the electronic component board and the second sheet metal member are thermally connected.

16. The image pickup apparatus according to claim 13, further comprising a second sheet metal member disposed closer to the back surface side of the image pickup apparatus than the electronic component board and disposed adjacent to the electronic component board in the optical axis direction, wherein the first sheet metal member includes a second arm portion extending in the optical axis direction toward the back surface side of the image pickup apparatus, and the image pickup device board, the second arm portion, and the second sheet metal member are thermally connected.

17. The image pickup apparatus according to claim 16, wherein the second arm portion and the second sheet metal member are mechanically connected to each other.

18. The image pickup apparatus according to claim 13, wherein an electronic component is not mounted on a range of a surface of the electronic component board facing the first arm portion, the range overlapping a projection region of the first arm portion in the optical axis direction.

* * * * *